Feb. 23, 1954 M. WEINBERG 2,670,401
X-RAY DIAGNOSTIC APPARATUS
Filed June 15, 1948 6 Sheets-Sheet 2
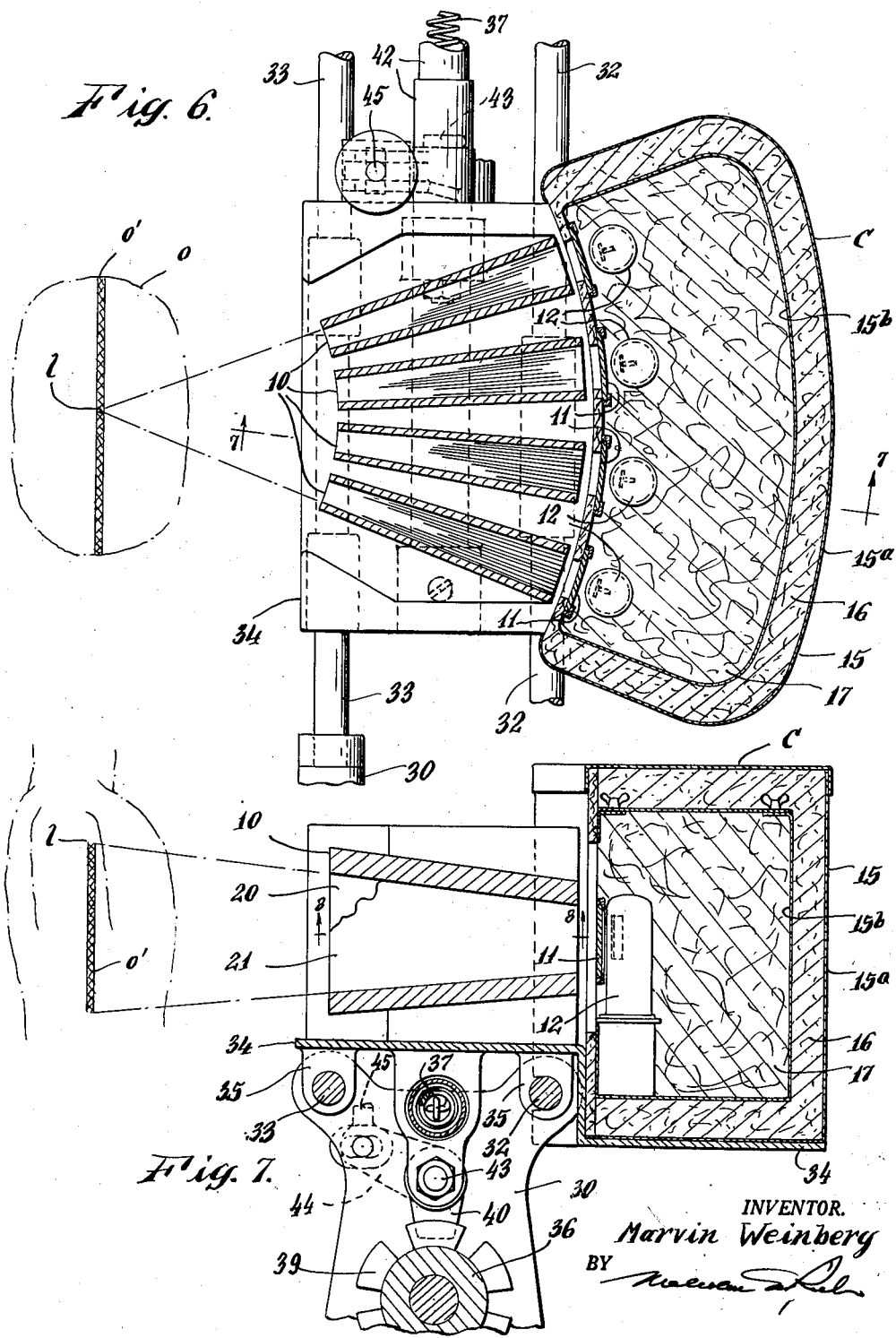
INVENTOR.
Marvin Weinberg
BY
ATTORNEY.

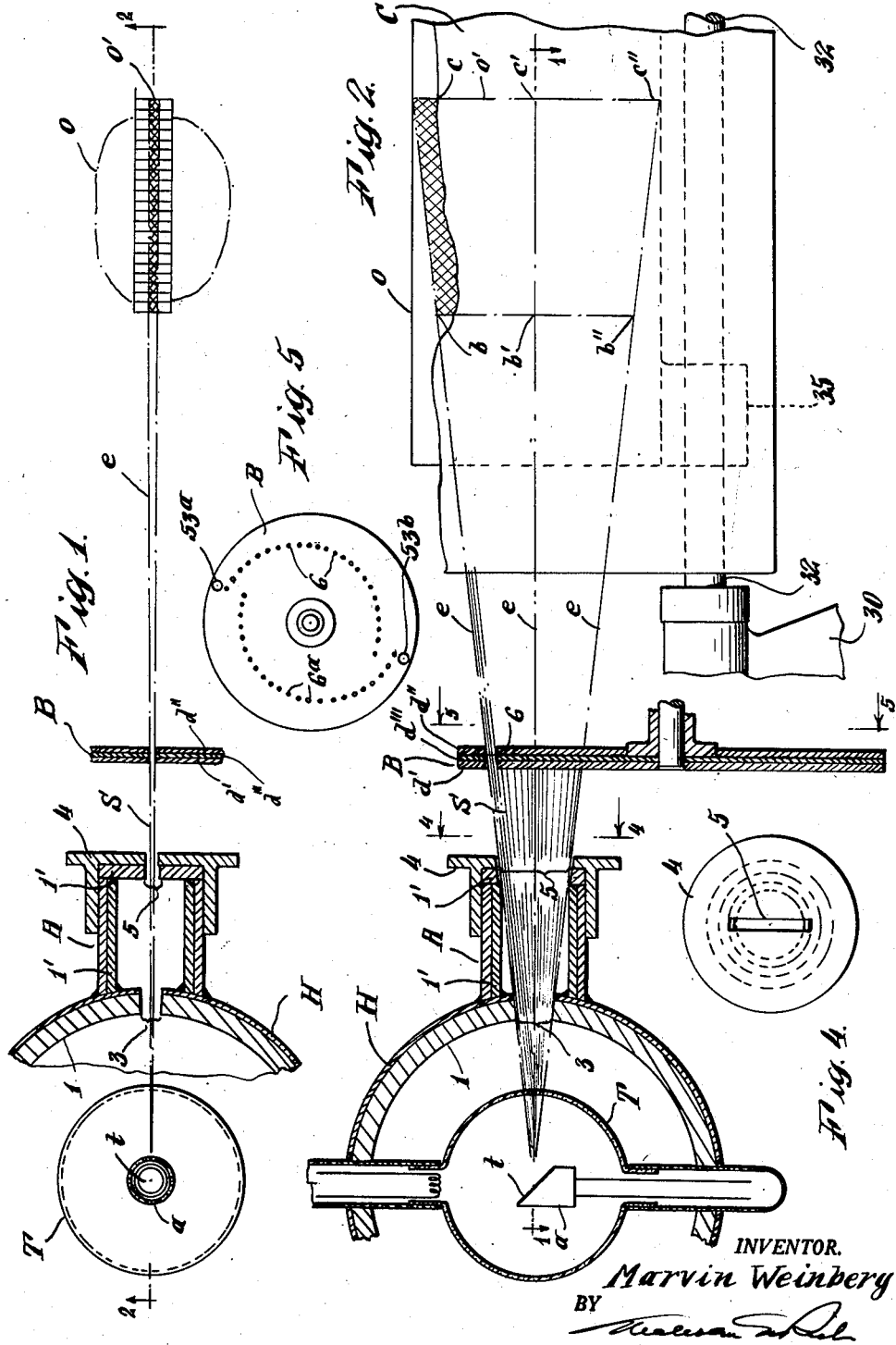

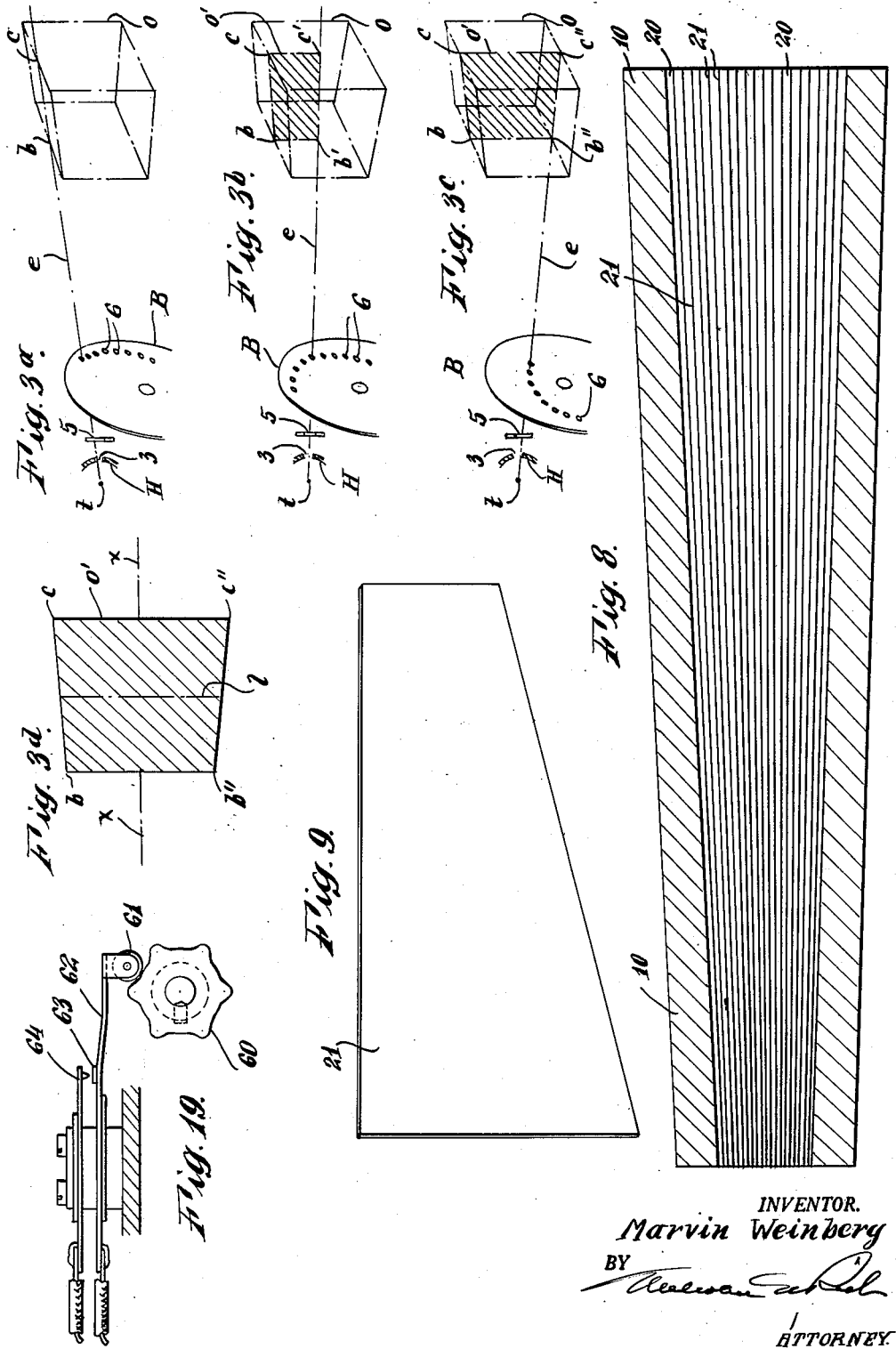

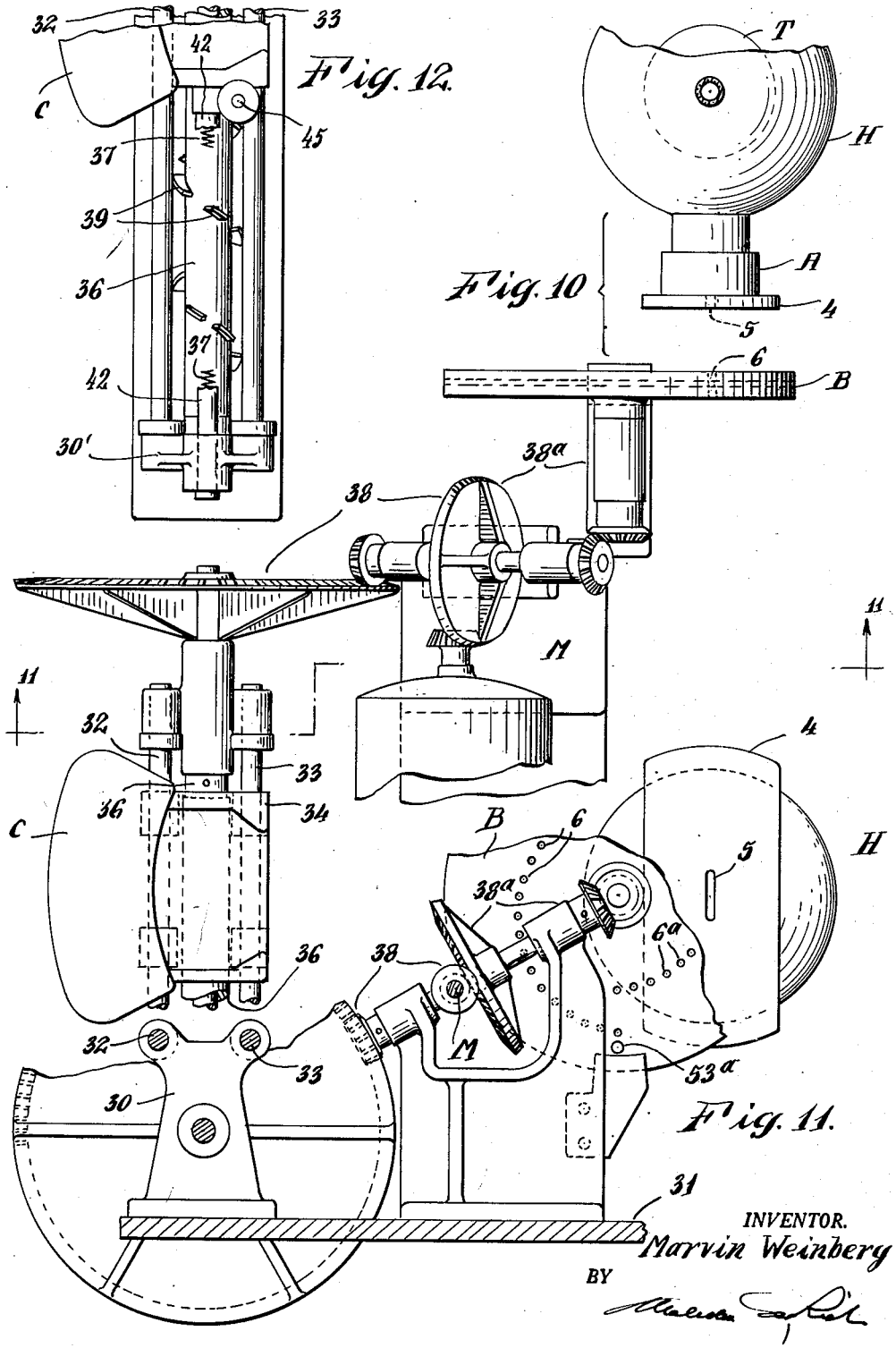

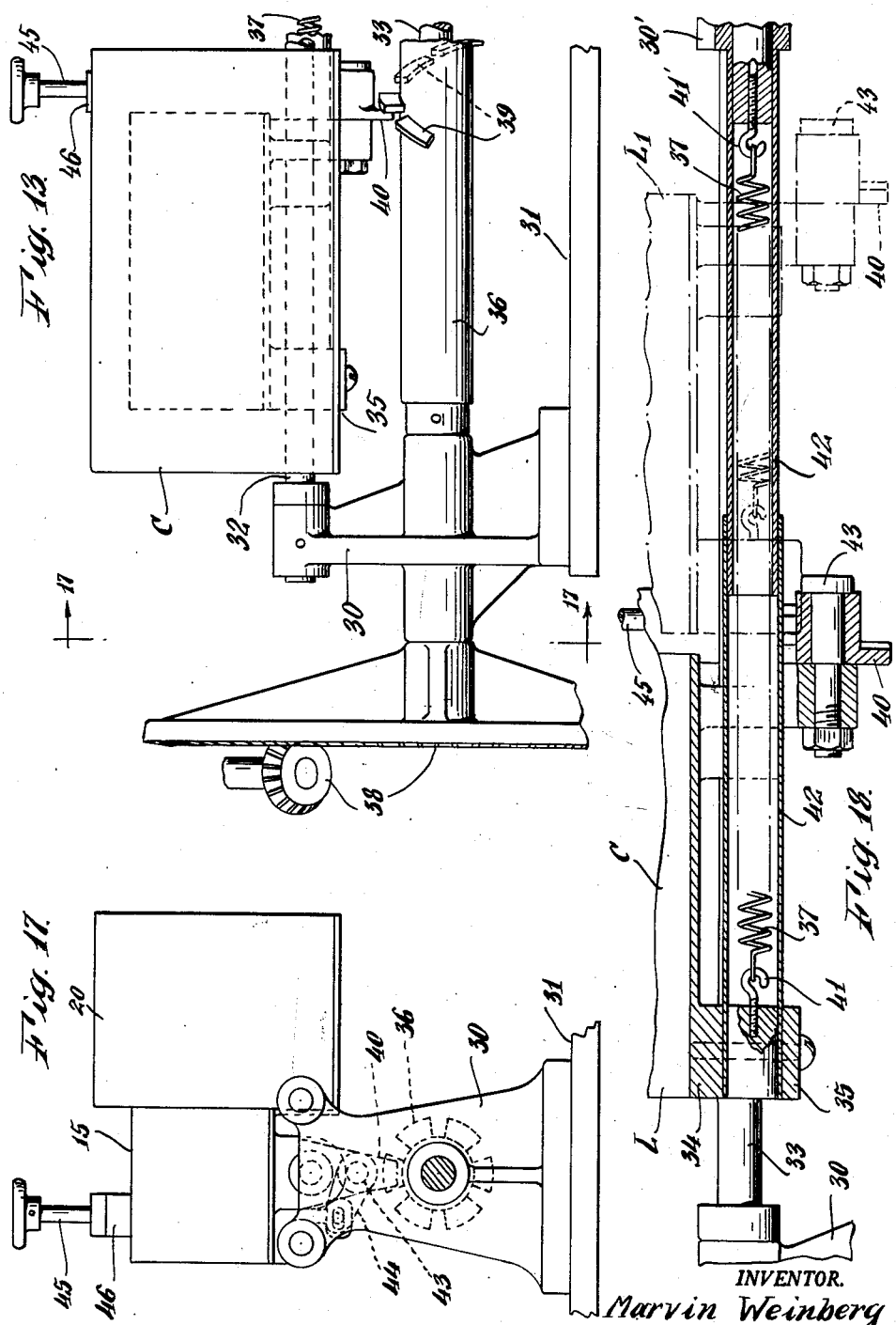

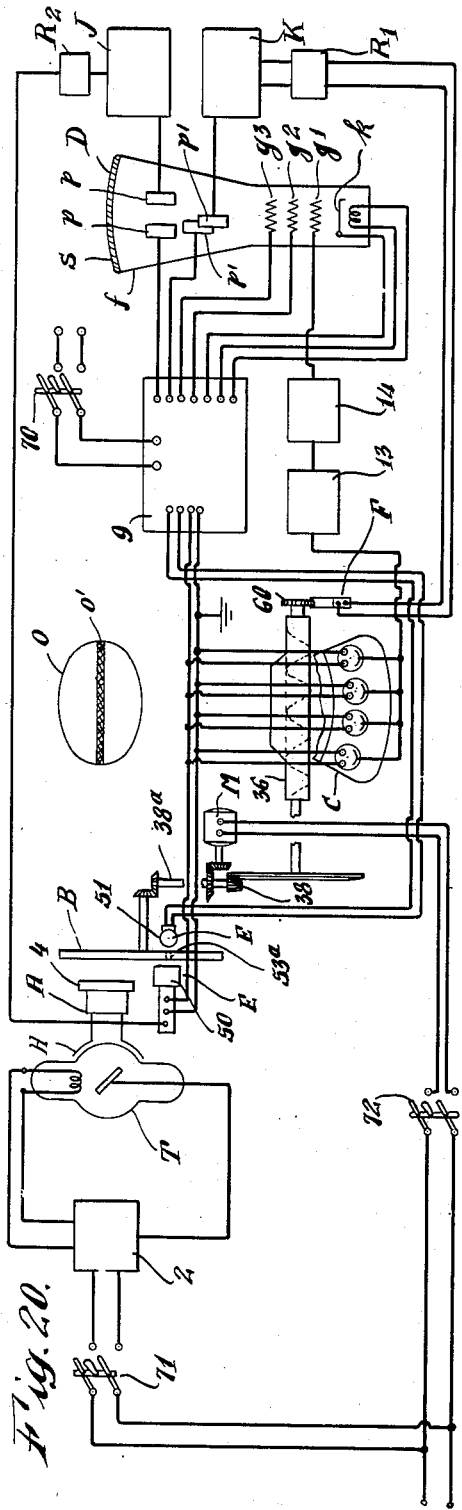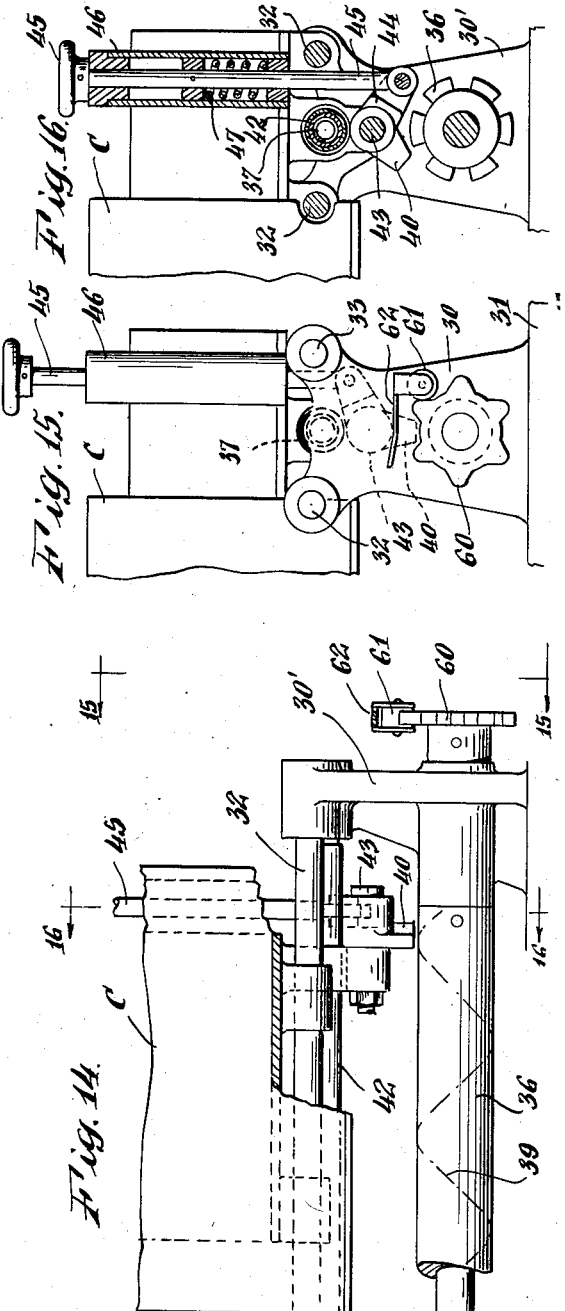

Patented Feb. 23, 1954

2,670,401

UNITED STATES PATENT OFFICE 2,670,401

X-RAY DIAGNOSTIC APPARATUS

Marvin Weinberg, New York, N. Y.

Application June 15, 1948, Serial No. 33,133

14 Claims. (Cl. 178—6.8)

This invention relates to X-ray diagnostic apparatus and has for its major object the provision of a new tool for use by X-ray diagnosticians in the examination of the internal structure and composition of materials.

Another object is to provide means to indicate visually the compositional and density differences present in a substance or material along the path of X-radiation projection therethrough.

Still another object is to provide an X-ray diagnostic device or apparatus capable of indicating visually the compositional and density differences present in a substance or material along the path of a small diameter beam of X-radiation projection therethrough and over a determined plane area thereof along the path of X-ray beam projection.

A further object is to provide a new method and a new tool facilitating and improving the technique of examining the internal structure and composition of substances and materials, particularly such differences that are present in living tissues.

Other objects and advantages will be apparent as the invention is hereinafter disclosed.

In accordance with these objects I have discovered that when a small diameter beam of X-radiation of any given wavelength and intensity is passed through a material, the amount of X-radiation scattered at any given point along the path of travel of the beam through the material varies with respect to the composition and density of the material at this point and that this variation may be utilized in visually indicating the same by means collecting the scattered radiation, or a determined portion thereof, emanating from a determined point along the path of projection and converting the collected scattered radiation into an electrical impulse, which when sufficiently amplified may be directed to change or alter the intensity of a cathode ray beam in a cathode ray oscillograph in such manner as to give a visual indication on the oscillograph screen of the amount of such collected scattered X-radiation.

I have further discovered that by causing such a small diameter beam to repeatedly traverse a determined path through the material, thereby to form a relatively thin sectioned irradiated plane sectioned area of determined height, and by scanning successive line areas of one face of this irradiated plane sectioned area transverse to the direction of X-ray projection, to collect the scattered X-radiation projected from each successive transverse line area along one face of the irradiated plane sectioned area within a determined angle from the perpendicular thereto at each level of small diameter beam projection in the line area and converting the collected scattered X-radiation from each line area into a series of electrical impulses, this series of electrical impulses may be utilized to vary the intensity of a cathode ray beam in a cathode ray oscillograph tube, the field oscillations of which are timed and synchronized to be in accord with the beam and line scanning movements, thereby to reproduce on the oscillograph screen a visual indication of the variations in composition and density of the material along the path of travel of the beam of X-radiation therethrough at each successive beam level along the line scanned area of the irradiated plane section of the object material, obtaining thereby a cross-sectional picture of the irradiated plane sectioned area for immediate visual study or for photographing for more considered diagnostic study.

In accord with these discoveries I have devised a new type of X-ray apparatus for use in the determination of compositional and density variations of material along the path of X-radiation projection therethrough and incorporating the features above noted, which apparatus is of particular utility in the diagnosis of such differences in composition and density that may be present in living tissues, one specific embodiment of which apparatus is illustrated in the accompanying drawings and is hereinafter described.

In the drawings:

Fig. 1 is a sectional view taken along plane 1—1 of Fig. 2;

Fig. 2 is a sectional view taken along plane 2—2 of Fig. 1;

Figs. 3a, 3b, 3c and 3d, are schematic perspective views illustrating one of the main features of the present invention;

Fig. 4 is a sectional view taken along plane 4—4 of Fig. 2;

Fig. 5 is a sectional view taken along plane 5—5 of Fig. 2;

Fig. 6 is an enlarged sectional view taken along plane 6—6 of Fig. 7, illustrating a second main feature of the present invention;

Fig. 7 is a sectional view taken along plane 7—7 of Fig. 6;

Fig. 8 is an enlarged sectional view taken along plane 8—8 of Fig. 7;

Fig. 9 is a perspective view of one of the elements indicated in Fig. 8;

Fig. 10 is a top view illustrating the mechanical elements of the invention and their relation to each other;

Fig. 11 is a sectional view of the same along plane 11—11 of Fig. 10;

Fig. 12 is an enlarged top view of the broken away end of the apparatus of Fig. 10;

Fig. 13 is an enlarged side view of the feature of Figs. 6 and 7 indicating its association with the mechanical elements of Fig. 10;

Fig. 14 is a broken away side view completing Fig. 13;

Fig. 15 is an end view taken along plane 15—15 of Fig. 14;

Fig. 16 is a sectional view taken along plane 16—16 of Fig. 14 showing one operating position;

Fig. 17 is a sectional view taken along plane 16—16 of Fig. 14 showing a second operating position;

Fig. 18 is an enlarged sectional view illustrating one mechanical element of the present invention;

Fig. 19 is a view illustrating another feature of the present invention; and

Fig. 20 is a schematic-diagrammatic view showing the various stationary and moving elements of the complete apparatus of the present invention in their relative order and operating relationship and the electrical circuit connections therebetween.

The apparatus illustrated in the drawings is one that has been specifically designed for use in the diagnosis of the internal composition and density structure of living tissues and is intended primarily for use in conjunction with the usual type of X-ray photographs which, as is well known, are essentially shadow images indicating the total density of the different portions of an irradiated area in the direction of X-ray projection. Normally, such shadow images are poorly defined and it is usually necessary to take a plurality of such shadow images, each from a different angle through the object area, for diagnostic examination. The present invention by providing means indicating visually the composition and density variations occurring along the path of X-ray projection and over an irradiated plane sectional area lying in the path of X-ray projection greatly facilitates the diagnostic examination of the subject area when used alone or when used to augment the information obtained from shadow image X-ray photographs taken of the same object area in the same or a different direction of X-ray projection.

In the drawings, the specific embodiment apparatus disclosed consists essentially of means to repeatedly scan the object area O in one plane and in one direction with a substantially unidirectional and small diameter beam e of X-radiation, thereby to irradiate a plane section o' of the object area O disposed in the path of X-ray projection; means to line scan successive transverse line areas l of the irradiated plane section o' of the object area O along one face thereof in the direction of X-radiation projection to collect the scattered X-radiation projected from the face of each said scanned line areas l of the irradiated plane section o' along a path of projection therefrom lying within a determined angle centered on the perpendicular to the said face; means limiting the collected scattered X-radiation to radiation following a straight line path of projection radiating from the center line axis of the transverse line area l; means converting the collected and limited scattered X-radiation of each line area l into an electrical impulse, the intensity of which varies with variation in the amount of said collected and limited scattered X-radiation; a cathode ray oscillograph tube and means synchronizing the oscillations of the cathode ray beam thereof over the target screen thereof with the movements of the beam scanning and line scanning means, respectively, to reproduce the scanned irradiated area thereon; and means impressing the said electrical impulses obtained on line scanning the irradiated plane section upon the cathode ray beam to vary the intensity thereof, thereby to visually indicate on the target screen of the cathode ray tube the compositional and density variations of the material traversed by the projected X-radiation along each line area. These instrumentalities and means will hereinafter be more specifically described.

Referring first to Fig. 20, which is a schematic-diagrammatic showing of the entire apparatus, the means for scanning an object area O with a small diameter unidirectional beam e of X-radiation repeatedly and unidirectionally in the same plane to obtain an irradiated plane section o' of said object area O is that indicated by the elements T, A and B, the latter element being actuated by motor M through gear train 38a interconnecting the motor M to element B, as will more fully hereinafter be disclosed.

The means for scanning successive transverse line areas of the irradiated plane section o' of the object area O to collect X-radiation scattered in each line area l and projected outwardly from the face thereof within a determined angle centered on the perpendicular and to limit same to radiation projected in a straight line path of projection radiating from the center of the scanned line area l and to convert the collected and thus limited radiation into an electrical impulse, the intensity of which varies with variation in the amount of such collected and limited scattered X-radiation, is that indicated by C which means is also actuated by motor M through an interconnecting gear train 38, as will more fully hereinafter be disclosed.

The cathode ray oscillograph tube is indicated by D and the means to impress the electrical impulse derived from means C on the cathode ray beam of said tube D is indicated by the associated electrical circuit connecting the line scanning means C and boxes 13 and 14 to grid $g_1$ of the tube D, all as will be more fully hereinafter disclosed.

Synchronism of the operation of the cathode ray oscillograph tube D with that of the two said scanning means is under the control of photoelectric means E and cam-actuated switch means F through the operation of means $R_2$ and $R_1$, respectively, shown electrically connected thereto, all as will be more fully hereinafter disclosed.

Referring now to Figs. 1 to 5, inclusive, the details of the small diameter beam scanning means of the present invention, as it has been specifically adapted for use in this specific embodiment may be noted. In this arrangement the X-ray tube T is enclosed within a housing H which is, as effectively as possible, made impermeable to X-radiation by means of lead sheathing l. The X-ray tube T, per se, forms no part of the present invention except in the combination with the other elements thereof as a source of X-radiation of desired wavelength and intensity and may consist of any of the modern type of X-radiation generators. The means indicated by box 2 (Fig. 20) drawing current from a supply source for actuating the X- ray tube T is a standard type of such means for energizing the tube with substantially pure direct current, and also forms no part of the present invention. As this means, per se, is old and well known in the art no further illustration or description thereof is believed required or necessary for those skilled in the art to understand or to comprehend such means and mechanisms or the present invention incorporating the same as a part thereof.

To obtain from tube T a substantially unidirectional and small diameter beam of X-radiation for the beam scanning purposes of this invention, housing H is provided with a rectangular opening 3 of determined small size, which is aligned to be centered opposite the center of inclined target face $t$ of anode $a$ of the X-ray tube T. Such an opening 3 permits the passage of a relatively thin cone segment S of X-radiation projected by anode $a$, through the housing H, which cone segment of radiation is passed through radiation absorbing tunnel A wherein all radiation not traversing a straight line path radiating outwardly from the cone apex located at the center of target area $t$ through the rectangular opening 3 is absorbed and removed therefrom.

Radiation absorbing tunnel A may take a plurality of different shapes and forms without essential departure from the invention to achieve the objective thereof. In the specific example shown it consists of a tubular body part A having a diameter somewhat greater than the height of rectangular opening 3 and a length which is materially greater than the diameter thereof, said body part being comprised of, or interiorly lined with, X-radiation-absorbing material $l'$, such as lead, substantially as shown. The open end of the tubular body part A is closed by a closure plate 4 in which is also provided a rectangular opening 5 centered in alignment with rectangular opening 3 and with target area $t$ through which the cone of X-radiation, following a straight line path radiating from the cone apex centered on target $t$, is projected. By limiting the width and height of rectangular openings 3 and 5 appropriately the thickness and cone angle of the beam of X-radiation S passing through opening 5 may be made to conform to any desired specification. Preferably, a thickness of not over about one millimeter is desired in the beam. The height of the beam at aperture 5 may be widely varied without essential departure from the invention, depending upon the distance between aperture 5 and object area O and the height of irradiated plane section area $o'$ therein that may be desired for line scanning in accordance with the present invention as one skilled in the art will readily recognize from the present disclosure. The inner face of end closure member 4 also is lined with X-radiation absorbing material $l'$.

For purposes of this specific embodiment I have arbitrarily selected a plane section area $o'$ for irradiation and line scanning in object area O which is approximately 100 millimeters by 100 millimeters and have designed the apparatus of the specific embodiment accordingly. The precise height of rectangular openings 3 and 5 will depend primarily upon the distance between the rectangular opening 5 and the object area O due to the cone angle of the projected X-radiation S involved and obtained. In general, a spacing of not over 6 inches to the first transverse line area to be scanned has arbitrarily been selected as being the best arrangement to provide. With this spacing rectangular openings 3 and 5 are approximately 17 and 33 millimeters high, respectively, and the width of each opening is approximately 1 millimeter.

Element B is provided to intercept the thin cone beam of radiation S passing through rectangular aperture 5 and to convert same into a small diameter beam $e$ of such X-radiation repeatedly traversing the object area O to scan same in one plane and to form therein the irradiated plane section area $o'$. Element B consists essentially of a rotating disc (B) which is opaque to X-radiation except through small diameter openings 6 therein which are aligned along a curved path in such manner as to be located successively upon rotation of element B about its axis in front of rectangular opening 5. Means, such as motor M and an interconnecting gear train 38a, are provided to rotate disc B at a determined desired rate of rotation. As indicated in the drawings (Fig. 5) disc B is provided with a plurality of small diameter arcuately aligned openings 6, each of equal and small diameter approximating one-half millimeter, the arcuate arrangement of said openings 6 being such as to present each successive aligned opening 6 in front of rectangular aperture 5 at a lower level as the disc B is rotated about its axis by the means provided, thereby causing a small diameter beam of radiation to move downwardly (or upwardly, depending on the direction of rotation of disc B) the height of the rectangular aperture 5. For purposes of this invention the diameter of this beam is preferably not over 1 millimeter, in order to obtain an irradiated section $o'$ of this approximate thickness. As indicated in the drawings a double arcuately arranged series of openings 6 are provided in disc B so that upon each rotation of the disc B the small diameter beam of radiation $e$ is caused to twice traverse the rectangular opening 5.

In the construction of disc B, a plurality of different materials and combinations of materials are utilizable to produce opaqueness to X-radiation and the particular design and construction of disc B depends as much on the desired rate of rotation of disc B as on anything else. In the present specific embodiment I have arbitrarily selected a rate of rotation and arcuate alignment of ½ millimeter diameter holes 6 therein for disc B which provides for the progressive movement of the one millimeter-diameter-beam $e$ from the top to the bottom of rectangular aperture 5 at a rate approximating 100 times per second. This rate of rotation of disc B requires the use of strong materials and the practical combination of materials to provide the necessary strength appears to be a sandwich comprised of outer discs $d'$—$d''$ consisting of heavy brass plates having a thickness approximating ¼ inch and an inner disc $d'''$ comprised of lead having a thickness of ⅛ inch. The relative thicknesses of the brass plates $d'$—$d''$ and inner lead disc $d'''$, however, being widely variable without essential departure from the invention but being generally of a thickness calculated with respect to the hardness of the X-radiation to effectively intercept at least the major portion but preferably all of such X-radiation striking the rear face of the disc B.

As a practical matter, except for the possible danger incident to the exposure of living tissues to such X-radiation, I have found that it is only necessary to reduce the X-radiation passing through the disc B, exclusive of that passing through openings 6 therein, to a quantity of relatively small order as compared to that passing through the openings 6, for purposes of effective detection of the scattered X-radiation in the irradiated area o' on line scanning the area o' by the line scanning means C. The contrast obtained between the two quantities of irradiation is effectively reflected in such collected scattered radiation. In the irradiation of living tissues, as desired in the present specific embodiment, however, substantially complete absorption of the X-radiation except that passing through each opening 6, is the preferred arrangement.

Referring now to Figs. 3a to 3d, inclusive, the result obtained by the operation of the beam scanning means including elements T, A and B is indicated schematically. As indicated the small diameter beam of radiation e from target area t passing through the first (upper) of the openings 6 strikes object area O along line b—c. A following opening 6 projects a similar diameter beam at a lower level b'—c' through the object area O. The last (lowest) opening 6 projects a similar diameter beam through object area O at the bottom level b''—c'', thereby completing what may be termed the vertical beam scanning of the plane section o' defined by the points b—c, b''—c'' (Fig. 3d) which is centered with respect to the axis of X-radiation projection (x) from the center of target area t of anode a of X-ray tube T through rectangular openings 3 and 5.

The frequency with which the small diameter beam e of X-radiation is caused to repeatedly traverse this area o' (b—c b''—c'') may be widely varied without departure from the invention. For the purposes of the present specific embodiment and in the examination of living tissues a frequency approximating 100 times per second has been found practical and effective as the time interval of irradiation involved is short enough to permit the use of X-radiation of the maximum hardness, if desired.

The means provided for rotating disc B about its axis may also vary widely without essential departure from the invention. In the specific embodiment illustrated I have shown a motor means M mechanically connected by a gear train 38a to rotate disc B, all as will be disclosed more fully in connection with Figs. 10 and 11. Motor means M is an electric motor of common design adapted for operation by alternating current of the usual 110 volts in most supply lines.

Referring now to Figs. 6 to 9, inclusive, the details of the various elements and means comprising the line scanning means C of the present invention may be noted.

This means C of the present invention consists broadly of tunnel means 10 to collect the scattered X-radiation projected from one face of the irradiated section o' along a transverse line area l thereof in a direction following a straight line path radiating from the line axis of said line area l within a determined angle; a fluorescent screen means 11 to convert same into light energy; a light sensitive tube means 12 to convert the light energy into electrical energy; and means 13 to amplify the said electrical energy obtained and means 14 to apply the amplified electrical energy to directly affect the intensity of the cathode ray beam of the cathode ray oscillograph tube D.

In the specific embodiment illustrated the means C more specifically consists of a plurality of radiation collecting tunnels 10, each substantially rectangular in section, said tunnels 10 being mounted in close spaced radiating relationship about a line axis disposed in a plane at a determined distance away from the open ends thereof at which may be located the irradiated section o' to be line scanned by the said tunnels 10.

The total number of such radiation collecting tunnels 10 may be varied widely without essential departure from the invention, depending upon the particular cone angle of scattered X-radiation collection that may be desired from each line area l of the irradiated section o'. In the specific example illustrated a cone angle of radiation collection approximating 45° which is centered on the perpendicular to the irradiated area o', is desired.

Each tunnel 10 is comprised of material, such as heavy brass plates, which is absorptive towards X-radiation and is interiorly divided into a plurality of radiating channels 20 formed by close-spaced plates 21, also comprised of X-radiation absorptive material, such as brass, to limit the X-radiation traversing through the tunnel to radiation projected in a straight line path radiating from the line axis of each line area l about which the plurality of tunnels 10 are disposed. The length of tunnels 10 is designed to substantially exclude X-radiation other than that from the line area being scanned from traversing the length of each tunnel 10. This length and the spacing between plates 21 may vary widely without essential departure from the invention.

The exit end of each tunnel 10 is closed by a fluorescent screen element 11 and a light sensitive tube 12 is disposed relative to the rear face of each screen 11 to be actuated thereby upon energization of the fluorescent screen 11 by the X-radiation projected through tunnel 10. A light radiation impermeable housing 15 encloses the exit ends of tunnels 10, the screen elements 11 and light sensitive tubes 12, said housing 15 having spaced inner and outer walls 15a and 15b between which is disposed thermal insulation 16 and being provided with means 17, such as solid carbon dioxide to maintain the temperature of tubes 12 at the desired low temperature for best operating efficiency.

Tubes 12 are electrically connected in parallel as indicated in Fig. 20, and the electric current flow induced therein by the light energy generated in screens 11 at each level of beam projection is amplified, by passing through amplifier means 13 to a desired magnitude and the amplified current thus obtained is applied by means 14 to the grid g' of cathode ray tube D to affect directly the intensity of the cathode ray beam of the tube D. Means 13 and 14, per se, are each old and well known electrical instrumentalities in the art and, per se, do not form a part of the present invention except in combination with the other means and instrumentalities thereof, and do not require further description or illustration for those skilled in the art to recognize the same or to recognize the functioning of the same in the present invention.

Of major importance, in this combination of elements comprising the line scanning means C of the present invention, is the tunnel means 10 for collecting a determined portion of the scattered X-radiation projected from one face of irradiation area o' along the line scanned area l and of limiting the collected radiation passing therethrough to radiation projected in a straight line path radiating from the center axis of the line scanned area $l$ for irradiation of fluorescent screen 11.

The conversion of the light energy of the screen 11 to electrical energy and amplification of the same to a magnitude effective for directly affecting the intensity of the cathode ray beam of tube D follows a conventional pattern well known in the prior art.

As indicated in Figs. 8 and 9, each tunnel 10 while being generally rectangular in section, is not of the same rectangular section over the entire length thereof. This variation in rectangular cross-section from end to end of each tunnel 10 is occasioned by the practical limits in rectangular section imposed at the exit end of the tunnel by the maximum size of fluorescent screen 11 effective for use with the specific type of photosensitive tube 12 employed, rather than upon any functional requirement of the tunnel itself. The effective maximum size of fluorescent screen 11 permissible for use with the light sensitive device 12 approximates 1.5 x 1.0 inches.

The total number of tunnels 10 provided in means C may be varied widely without departure from the invention, as may also the angle of collection. I have arbitrarily selected an angle of 45° centered on the perpendicular to the irradiated area $o'$ as giving theoretically the best results, although such an angle of collection centered at an angle of 100°–120° (in the direction of X-ray projection) theoretically should give equally as good, if not better, results as far as the quantity of scattered X-radiation collected is concerned.

As the effectiveness of scanning means C is directly dependent upon the distance of projection of the scattered X-radiation before entering tunnels 10, I have arbitrarily limited this distance to six (6) inches in the arrangement illustrated as representing the closest practical distance for general purpose use in the scanning of human bodies with the apparatus. This distance, however, may be widely varied without essential departure from the invention.

The light sensitive device 12 in the specific embodiment shown is a multiple electrode type tube of recent design sold under the code number 931-A or 1P21. In this type of tube the current flow initiated therein by light radiation falling thereon is amplified a plurality of times in passing successively to the plurality of electrodes. This type of device is especially designed for the detection of extremely small quantities of light energy and in the detection of light energy of the small quantities herein involved requires refrigeration to reduce the inherent noise or adventitious response of the tube to the lowest possible level.

As may be seen from Figs. 6 and 7, in operation the scattered X-radiation projected from any line area $l$ on which the plurality of tunnels 10 are centered, is collected by the tunnels 10 if the angle of projection is within the angle covered by the tunnels 10. Only that radiation following a straight line path of projection radiating from the center axis of the line area $l$, however, passes through the channels 20 to the exit end of the tunnel 10 to emerge therefrom to strike the plurality of flourescent screens 11 (one for each tunnel 10) to activate said screen for the generation of light radiation. As the light radiation generated in each screen 11 energizes separate tubes 12, the total amount of the electrical energy developed in the plurality of tubes 12 represents the total quantity of such selected or limited scattered X-radiation projected in any given time interval from the line area $l$ being scanned. The plurality of tubes 12 are accordingly, electrically connected in parallel and the total electrical energy generated by the plurality of tubes 12 is fed into the amplifier 13 for amplification to the desired magnitude for application by means 14 to gird $g_1$ in tube D to modify the intensity of the cathode ray beam therein.

The means for moving the line scanning apparatus C including tunnels 10 and the elements enclosed by housing 15, in the direction of X-ray projection thereby to determine the amount of scattered X-radiation emitted in successive transverse line areas $l$ of the irradiated area $o'$, may be widely varied without essential departure from the present invention. Where the apparatus is used to examine living tissues as herein desired the time of exposure of the tissue to the X-radiation is of primary importance and it is essential to limit this time of exposure to the shortest practical time effective to produce the desired line scanned irradiated result without resultant injury to the tissue. In the instant invention, I have arbitrarily set a time of exposure of about one (1) second for small diameter beam irradiation of the 100 millimeter square plane section area $o'$ of the object area O in accordance with the present invention, when said area is comprised of living tissue. By limiting the beam diameter to one millimeter and employing a rate of beam scanning approximating 100 times per second, the time interval of exposure per irradiation of each one millimeter diameter area is reduced to a time interval permitting the use of the very hardest X-radiation without possibility of harming the living tissue. Within this time interval the plane section area $o'$ is irradiated by the small diameter X-ray beam at a rate approximating one hundred (100) times per second. The irradiated area also is to be line scanned within the one (1) second time limit. The means employed for mechanically effecting this line scanning of the irradiated area is illustrated in detail in Figs. 10 to 18, inclusive, of the drawings which supplement the details of Figs. 6 and 7.

The means provided for moving the line scanning means C consists essentially of means sustaining the scanner device to be movable in the direction of X-ray projection and means actuated by the motor M to move the scanning device in the direction of X-ray projection at a determined rate for a distance covering the irradiated area $o'$ to be scanned within the arbitrary time interval of one (1) second.

The means illustrated in Figs. 10 to 18 comprises essentially a frame consisting of end supports 30—30' resting on a base 31 and held in vertical spaced relation by rods 32—33 on which base plate 34 is slidably mounted such as by the standard type of mounting 35—35'. The scanning device C, consisting of tunnels 10 and housing 15, is mounted in any convenient manner on the base plate 34 to be movable therewith.

The base plate 34 with the scanning device C mounted thereon, is arranged to be moved from first line scanning position shown in solid line to final line scanning position shown in dotted line (Fig. 18) along the rods 32—33 by means of driven helical screw 36 operating against the tension of spring means 37. Helical screw 36 is driven by motor M by means of the gear train 38 arrangement shown in Fig. 10, the gear ratios being selected to provide the desired rate of speed to helical screw 36 to move the means C a 100 millimeter distance of one (1) second.

In the line scanning of the irradiated area o' it is preferred to line scan successive spaced line areas l thereof, each for the same determined time interval in order to obtain from each line scanned area l an electrical impulse having a value comparable to that of any other line area l. To accomplish this result the screw thread of helical screw 36 is broken up into a succession of spaced teeth 39 each of which are curved in such manner as to hold the depending knife 40 in engagement therewith in one position of movement until the tooth 39 is rotated clear of the knife whereupon the spring means 37 operates to advance the knife against the face of the following tooth 39, the space gap therebetween being one millimeter, thereby moving the line scanning device C to a position opposite the next adjacent line section for scanning. In this arrangement the width of each tooth 39 at any given rate of rotation of the screw 36 determines the time interval of line scanning each successive one millimeter line section l of the irradiated area o'. As the total width of area o' is 100 millimeters the time interval of scanning each line area is $\frac{1}{100}$ of a second.

Spring means 37 is a helical spring secured at each end in screw hooks 41—41', one of which (41) is anchored to the movable carriage and the other of which (41') is secured to the end support 30'. The spring 37 is enclosed in a telescoping tubular housing 42 to prevent sagging of the spring in tensioned or untensioned position.

Knife means 40 is arranged to be movable into and out of tooth engaging position by the means illustrated in Figs. 15, 16 and 17, wherein it may be noted that the knife 50 is mounted for pivoting about axis 43 by means of lever arm 44 which is secured in a loose link connection to the end of pin 45 sustained to be axially movable in housing 46 against the spring tension of spring 47. The normal position of knife 40 is tooth engaging position from which it is movable upon depressing pin 45 against the action of spring 47 so that the carriage (base plate 34) can be returned manually to first position thereby tensioning spring 37, the release of knife 40 to normal position then operating to re-engage the knife against the face of one of the teeth 39 to secure the carriage in first position from which, on rotation of helical toothed screw 36 the carriage sustaining means C is again moved to the final or dotted line position shown in Fig. 18.

In the normal use of this apparatus in the diagnostic examination of living tissue, such as a section of a human body only one horizontal line scanning of the irradiated area o' is contemplated and the maximum time interval of exposure to X-radiation provided (1 second) is that calculated to obtain such line scanning within a safe time interval permitting the use of the hardest X-rays. The present method of vertically scanning a determined area of living tissue repeatedly with a small diameter beam of substantially unidirectional X-radiation to irradiate a determined plane section area thereof also has the major advantage of permitting the use of X-radiation of the maximum intensity, as the time interval of exposure and the area exposed to each beam can each be made extremely small so that the same small area can be repeatedly irradiated over an overall time interval totalling one (1) second that is much greater than that safely used in continuous exposure of the same sized area to the same hardness radiation.

With this advantage in mind I find, for example, that in the irradiation of a selected area of a human body with X-radiation I may employ a beam of substantially unidirectional X-radiation about 1 millimeter in diameter and irradiate the same area as frequently as one hundred (100) times per second with X-radiation of much higher intensity than heretofore employed for the same time interval without injury to the living tissue. Where the area to be line scanned is small, of the order of 100 millimeters in length in the direction of X-ray projection, it is preferred to also limit the line scanning time interval to one (1) second to be well on the safe side since the order of intensity of the X-radiation corresponds to a tube anode current of $\frac{1}{2}$ ampere With these arbitrary limitations in mind gear train 38a is designed to rotate scanning disc B at a rate approximating 50 times per second which with the double row of openings 6—6a therein, each of which has a diameter of one (1) millimeter, provides a scanning rate of 100 times per second in the irradiated plane section o' of the object area O. Gear train 38 is designed to provide in screw 36 a rate of rotation and spiral tooth arrangement which will cause the scanning device C to line-scan successive one millimeter areas of a 100 millimeter length of the irradiated area in one (1) second. The height of the line scanned area may be widely varied without essential departure from the invention but I have generally found it most practical to line scan a height which is approximately equal to the line scanned width, as this square area is most conveniently reproduced on the fluorescent screen of the oscillograph tube D.

It is important also to select vertical and horizontal scanning rates which are relative and reproducible by the cathode ray oscillograph tube. Such a tube, per se, is old and well known in the art and is widely used in a plurality of different ways. The operation of the tube and the control equipment normally employed therewith to regulate the vertical and horizontal scanning rates of the cathode ray beam thereof over the phosphorescent screen area thereof are believed too well known to require extensive disclosure in this application to enable those skilled in the art to recognize the same or to adapt same for the purposes of the present invention.

However, referring to Fig. 20, I have indicated the tube D as having an indirectly heated cathode $k$, a plurality of grid electrodes $g_1$, $g_2$, $g_3$, and two pairs of oppositely aligned plate electrodes $p$—$p$ and $p'$—$p'$ all enclosed within an envelope $f$. Phosphorescent screen $s$ is disposed on the inside face of the envelope $f$ in alignment with the cathode, grid and plate electrodes. The cathode ray beam from cathode $c$ normally hits the center of the screen $s$ but by the operation of plate electrodes $p$—$p$ and $p'$—$p'$ can be made to traverse the screen $s$ in an orderly manner as is well known in the art. The intensity of the cathode ray beam and the resulting luminosity produced when the beam hits screen $s$ is controlled by the electrical potential impressed upon the grid electrode $g_1$. Heretofore in the art, the specific means 14 has been utilized in a plurality of ways to so vary the potential on grid $g'$ in response to varying electrical impulses fed thereinto. In the present invention these varying impulses are derived from the means C amplified by amplifier means 13 as heretofore practiced in the art.

In the present invention, the frequency of the vertical and horizontal scanning of the irradiated area is impressed upon plate electrodes $p$—$p$ and $p'$—$p'$, by means well known in the art under the control, respectively, of photo-sensitive means E and mechanical switch means F.

In the usual cathode ray oscillograph apparatus the operating current therefor is derived from a power-pack I normally associated with tube D, said power-pack being energized by alternating current of the usual 110 or 220 volts drawn from a supply line. Suitable connections are provided in the power pack I to draw off the required operating voltages and current for application to the cathode, grid and plate electrodes of the tube D. The variations of the plate electrode voltages necessary to cause the cathode ray beam of the tube to oscillate over the prescribed area of the screen $s$ with the frequency desired and in the manner desired is under the control of a means J and K, respectively, which normally is associated with the apparatus and, per se, forms no part of the invention except as a part of the combination thereof.

Photosensitive means E, however, controls the operation of means J, which regulates the vertical movement of the cathode ray beam over the screen field. This means E consists essentially in photo-sensitive tube 50 and a means, such as lamp 51 to project a beam of light radiation and means aligning the tube 50 and lamp 51 on opposite sides of rotating disc B in a position to be in alignment with an opening 53a therein which upon rotation of the disc periodically permits the light from lamp 51 to strike tube 50 to energize the same, the periodicity of energization in the instant specific embodiment being twice for each revolution of disc B due to the provision of a double arcuate row of spaced openings 6 therein and two such openings 53 ($a$ and $b$).

The current flow in photo-tube 50 is amplified in a way well known in the art and the amplified current is passed into a sweep generator means $R_2$, and is utilized to actuate vertical scanning control means J at the frequency of current impulse generated in photo-tube 50 upon rotation of disc B. Sweep generator means $R_2$, per se, is old and well known in the art and forms no part of the invention except the combination with the other elements thereof.

Means F consists essentially of a rotating star cam 60 (Figs. 14 and 19) mounted to rotate with rotation of screw 36 either directly or through a connecting gear train as may be desired. A roller 61 on the end of contact arm 62 is disposed to make roller contact with the face of cam 60 in such manner that as the roller climbs each cam point face contact 63 on arm 62 makes circuit closing contact with fixed contact 64 (Fig. 19) closing an electrical circuit actuating relay $R_1$ to actuate the horizontal scanning control means K. With any given rate of rotation of screw 36 the rate of rotation of star cam 60 may be made to provide a periodicity of contact closings corresponding to the periodicity of scanner movement, which in the instant specific example is 100 times per second.

It is believed that it is unnecessary to extensively describe the electrical circuit diagram of Fig. 20, it being apparent therefrom that the current for energizing motor M, X-ray tube T and oscillograph tube D is derived from the same supply source (normally 110 v. A. C.) the energization of each being under the control of a knife switch. In the normal operation of the apparatus, the cathode ray oscillograph tube D is energized by the closing of its current supply switch 70 and the operation of the same is stabilized and standardized to approximate that desired. The X-ray tube T then is energized by the closing of switch 71, with the object to be diagnosed located properly in the object area at and in alignment with the path of X-radiation for irradiation of the vertical plane section $o'$ therein to be scanned, and motor M is substantially simultaneously energized by closing switch 72 to initiate vertical and horizontal scanning of the determined irradiated plane section of the object during the arbitrary time interval of one (1) second, at the end of which time interval the X-ray device and motor M are de-energized by pulling the knife switches 71 and 72 manually or automatically, as may be desired, and the scanning means C is re-set to first position ready for the next scanning operation.

I have found it to be advantageous to photograph the visual record impressed on the oscillograph tube screen by the practice of the present invention for permanent record and for purposes of diagnostic study and examination and comparison with the shadow images obtained in usual X-ray pictures.

Various other mechanical, photographic, optical and electrical means capable of being actuated or controlled by the varying intensity electrical current obtained from means C of the present invention such as those now known in the art and heretofore employed as equivalent means for cathode ray oscillograph tubes, may be substituted for the cathode ray oscillograph tube of the present invention to obtain a visual indication of such varying intensity electrical currents without essential departure from the invention.

Various modifications and departures from the specific embodiment of the invention herein described and illustrated in the drawings will occur to those skilled in the art and all such modifications and departures and improvements of the invention are contemplated as may fall within the scope of the following claims:

What I claim is:

1. In an X-ray diagnostic apparatus the combination comprising an X-ray tube and means to energize the same; a cathode ray oscillograph tube and means to energize the same; means limiting the X-radiation projected from the X-ray tube to a unidirectional small diameter beam, projected through an object area; means to collect from any small point area along the path of beam X-ray projection through the object area, the X-radiation scattered therefrom in one general direction substantially at right angles to the direction of beam X-ray projection, means converting said collected scattered X-radiation into electrical energy, and means applying said electrical energy to directly affect the intensity of the cathode ray beam of the said cathode ray oscillograph tube.

2. The combination of claim 1, wherein means is provided to cause said small diameter beam of X-radiation to repeatedly traverse unidirectionally a straight line path through the object area, thereby irradiating a determined plane section area thereof; wherein said means to collect scattered X-radiation comprises means collecting said scattered radiation projecting from one face of said irradiated plane section along a transverse line area thereof; and wherein means is provided to progressively move said collecting means over successive contiguous transverse line areas; and wherein means synchronizing the scanning movement of the cathode ray beam of the said cathode ray oscillograph tube over the screen area thereof with the beam movement and with the line area collecting means movement is provided thereby to reproduce the irradiated plane section area of the object area thereon with the varying intensity cathode ray beam obtained.

3. An X-ray diagnostic apparatus comprising in combination an X-ray tube and means energizing the same; a cathode ray tube oscillograph and means energizing the same; means for projecting a small diameter beam of X-radiation from the X-ray tube through an object area, said means including means causing the said beam to repeatedly traverse a straight line path through the object area thereby to irradiate a plane section thereof lying in the direction of X-ray projection; means to successively collect the scattered X-radiation projected from one face of the irradiated plane section along adjacent contiguous transverse line areas, said collected radiation having a direction of projection lying within a wide angle disposed on opposite sides of the perpendicular to the said face, means absorbing all such collected radiation except that having a direction of projection radiating from the axis of the line area involved; means converting said excepted collected radiation into light energy; means converting the light energy into electrical energy, and means applying the electrical energy to the cathode ray tube to directly affect the intensity of the cathode ray beam therein; and means synchronizing the scanning movement of the cathode ray beam of the cathode ray tube over the oscillograph screen therein with the scanning movements of the said beam and line area scanning means, respectively, through and over the said object area.

4. An X-ray diagnostic apparatus comprising in combination a cathode ray tube oscillograph and means energizing the same; means projecting a small diameter unidirectional beam of X-radiation through an object area and means causing the said beam to repeatedly traverse a straight line path thereby to irradiate a plane section of said object area lying in the direction of X-ray projection, means collecting the X-radiation scattered in traversing said object area and emitted from one face of said plane section in a direction radiating from all points lying along a transverse line area thereof and within a determined wide angle centered at about the perpendicular to said face, means progressively moving said collecting means over the said face in the direction of X-ray projection, means converting the collected scattered X-radiation into electrical energy, means applying said electrical energy to directly affect the intensity of the cathode ray beam of the cathode ray oscillograph tube, and means synchronizing the vertical and horizontal scanning movements of the cathode ray beam over the field of the screen element in the cathode ray tube with the beam and line scanning movements, respectively, thereby to reproduce on the said screen the irradiated plane section area and the line area differences in the amount of scattered X-radiation collected along one face thereof.

5. In an X-ray diagnostic apparatus the combination consisting of a cathode ray tube oscillograph and means energizing the same; an X-ray tube and means energizing the same; means limiting the X-radiation from the said X-ray tube to a small diameter beam of substantially unidirectional X-radiation projected through an object area, means to repeatedly move the said beam in a straight line path through the object area to irradiate a selected plane section thereof lying in the direction of X-ray projection, means to collect from a transverse line section area of said irradiated selected plane section area the scattered X-radiation emanating from one face thereof in a direction radiating from the line axis of said line area and lying within a determined wide angle which is less than 180°, means to convert the collected scattered X-radiation into electrical energy, means to progressively move said collecting means over the face of said irradiated plane section area to collect successively the scattered X-radiation emanating from contiguous selected line areas, means to apply the electrical energy thereby obtained to affect directly the intensity of the cathode ray beam of said cathode ray tube oscillograph, and means to synchronize the horizontal and vertical scanning movements of the cathode ray beam over the target area of said oscillograph tube to correspond with the movements of the X-ray beam moving and line collecting means thereby to reproduce the irradiated plane section area on the target area with the varying intensity cathode ray beam.

6. The method of determining the internal compositional and density variations in a material which comprises scanning a selected internal area in one plane with a small diameter beam of primary X-radiation of known characteristics and line scanning successive transverse line areas along one face of the irradiated internal area to collect the scattered X-radiation projecting therefrom at each level of beam projection in a path radiating outwardly from the line axis of each line area in a direction lying within a determined wide angle lying on opposite sides of the perpendicular to said face, converting the collected scattered X-radiation into electrical energy and applying the same to directly affect the intensity of the cathode ray beam in a cathode ray oscillograph tube, the vertical and horizontal scanning movements of said beam over the screen target area thereof being synchronized to accord with the beam and line scanning movements, respectively, employed.

7. The method of determining composition and density variations of material which comprises repeatedly irradiating a plane section area of the material with a small diameter beam of X-radiation and line scanning one face of the irradiated area to collect scattered X-radiation projecting from each line scanned area in a determined direction, and converting the collected scattered X-radiation from each line scanned area into an electrical impulse, the intensity of which has a direct relation to the composition and density of the material at the said line area, and directing said impulse to the actuation of means visually indicating variations in the intensity of such impulses.

8. The method of claim 7, and applying said electrical impulse to the cathode ray beam of a cathode ray oscillograph tube to affect the intensity of said beam.

9. The method of examining the interior of a material which comprises repeatedly irradiating an internal plane section area of the material, line scanning successive transverse line areas along one face of the irradiated area to collect X-radiation scattered from each line area over a determined angle lying on opposite sides of the perpendicular to the said face, converting said collected radiation to light radiation, converting the light radiation to electrical energy, and applying said electrical energy to affect the intensity of a cathode ray beam in a cathode ray oscillograph tube, the vertical and horizontal oscillations of which beam over the screen element therein being synchronized to conform with the beam and line scanning rates, respectively.

10. An X-ray diagnostic apparatus comprising means to repeatedly irradiate successive contiguous line areas of a plane section of an object, means to collect separately the scattered X-radiation projecting substantially perpendicularly from one face of the irradiated plane section at a plurality of points along each contiguous irradiated line area, means converting the scattered radiation collected at each said point into an electrical impulse, means amplifying each said electrical impulse a determined degree and means converting the plurality of amplified electrical impulses into a visual image of the irradiated plane section with the varying intensities of the amplified electrical impulses representing the composition of the material comprising the object along the plane section of X-ray projection.

11. An X-ray diagnostic apparatus comprising in combination means to project a small diameter beam of X-radiation through an object to irradiate repeatedly successive contiguous line areas along a plane section of the object, and means to scan the irradiated plane section of the said object along contiguous transverse line areas to collect the scattered X-radiation emanating from the irradiated plane surface at each point of intersection of the X-radiation with the transverse line scanning means in one direction substantially normal to one face of the said irradiated plane section area, means to convert the scattered X-radiation collected at each intersection point into an electrical impulse having an intensity relative to the amount of collected radiation and varying in intensity with variation in said amount, and means to convert said electrical impulses into a visual reproduction of the irradiated plane section, the pattern of which is indicative of the composition of the object along the irradiated plane section.

12. The X-ray diagnostic apparatus of claim 11, wherein said means to project a small diameter beam of X-radiation through an object to irradiate repeatedly successive contiguous line areas along a plane section of an object comprises an X-ray tube and means energizing the same to produce X-radiation, an X-ray impermeable shield enclosing the said X-ray tube, a small sized rectangular opening in said shield to permit a segment of a beam of X-rays to project therethrough, a radiation absorbing tunnel surrounding the opening, an X-ray impermeable closure member closing the end of said tunnel, a small sized rectangular opening in said closure member, said opening being aligned with the first opening, a rotating radiation impermeable disc disposed in front of said closure member and covering the said opening therein, and a plurality of small diameter openings in said disc aligned therein to be successively positioned in front of the said opening in the closure member during disc rotation with each successive opening at an adjacently lower level in one direction of disc rotation and during one complete revolution of the disc.

13. The X-ray diagnostic apparatus of claim 11, wherein said transverse line scanning means comprises a plurality of radiation impermeable tunnels aligned axially in the same plane and sustained in transverse alignment to the direction of X-ray projection in a position adjacent the object being irradiated with the tunnel axes lying in a plane substantially normal to the irradiated plane section, means to move the said aligned tunnels from one side of the irradiated plane section to the opposite side in successive contiguous positions over the irradiated plane section of the said object, a photo-sensitive device in the remote end of each said tunnel to convert the scattered X-radiation traversing the tunnel into an electrical impulse, and means amplifying each electrical impulse separately to a determined degree.

14. The X-ray device of claim 11, wherein said means to convert the plurality of amplified electrical impulses obtained into a visual image of the irradiated plane section of the said object which is representative of object composition comprises a cathode ray oscillograph tube and means energizing the same, means sychronizing the frequency of the horizontal scanning beam of the cathode ray tube with the frequency of X-ray beam projection along the contiguous line areas of the irradiated plane section of the object and means synchronizing the frequency of the vertical deflection of the said horizontal beam with the movement of the transverse line scanning means.

MARVIN WEINBERG.

References Cited in the file of this patent

UNITED STATES PATENTS

| Number | Name | Date |
|---|---|---|
| 1,838,537 | Dauvillier | Dec. 29, 1931 |
| 1,961,713 | Simjian | June 5, 1934 |
| 2,048,094 | Applebaum | July 21, 1936 |
| 2,219,113 | Ploke | Oct. 22, 1940 |
| 2,234,806 | Ploke | Mar. 11, 1941 |
| 2,277,756 | Hare | Mar. 31, 1942 |
| 2,319,712 | Williams | May 18, 1943 |
| 2,442,287 | Edwards | May 25, 1948 |
| 2,477,307 | Mackta | July 26, 1949 |